United States Patent
Naeimi et al.

(10) Patent No.: US 10,061,376 B2
(45) Date of Patent: Aug. 28, 2018

(54) OPPORTUNISTIC POWER MANAGEMENT FOR MANAGING INTERMITTENT POWER AVAILABLE TO DATA PROCESSING DEVICE HAVING SEMI-NON-VOLATILE MEMORY OR NON-VOLATILE MEMORY

(71) Applicant: Intel Corporation, Santa Clara, CA (US)

(72) Inventors: Helia Naeimi, Sunnyvale, CA (US); David Keppel, Seattle, WA (US)

(73) Assignee: INTEL CORPORATION, Santa Clara, CA (US)

( * ) Notice: Subject to any disclaimer, the term of this patent is extended or adjusted under 35 U.S.C. 154(b) by 148 days.

(21) Appl. No.: 14/752,789

(22) Filed: Jun. 26, 2015

(65) Prior Publication Data

US 2016/0378169 A1 Dec. 29, 2016

(51) Int. Cl.
| | |
|---|---|
| *G06F 1/00* | (2006.01) |
| *G06F 1/32* | (2006.01) |
| *G06F 1/26* | (2006.01) |
| *G06F 1/30* | (2006.01) |

(52) U.S. Cl.
CPC ............ *G06F 1/3275* (2013.01); *G06F 1/263* (2013.01); *G06F 1/30* (2013.01); *G06F 1/3212* (2013.01); *G06F 1/3246* (2013.01); *G06F 1/3287* (2013.01); *Y02D 10/13* (2018.01); *Y02D 10/14* (2018.01); *Y02D 10/174* (2018.01)

(58) Field of Classification Search
CPC ........ G06F 1/3287; G06F 1/30; G06F 1/3212; G06F 1/3246; G06F 1/3275
See application file for complete search history.

(56) References Cited

U.S. PATENT DOCUMENTS

| | | | | |
|---|---|---|---|---|
| 5,920,728 | A | * 7/1999 | Hallowell | G06F 1/30 713/300 |
| 2009/0125744 | A1 | * 5/2009 | Goodnow | G06F 1/3203 713/330 |
| 2009/0268541 | A1 | * 10/2009 | Goodnow | G11C 5/143 365/226 |
| 2010/0088494 | A1 | * 4/2010 | Elnozahy | G06F 9/3863 712/228 |
| 2011/0001485 | A1 | 1/2011 | Feight et al. | |
| 2011/0113208 | A1 | * 5/2011 | Jouppi | G06F 11/1438 711/162 |
| 2012/0256492 | A1 | 10/2012 | Song et al. | |
| 2013/0241465 | A1 | 9/2013 | Teggatz et al. | |
| 2013/0324059 | A1 | 12/2013 | Lee et al. | |
| 2014/0333136 | A1 | 11/2014 | Olah et al. | |
| 2016/0314078 | A1 | * 10/2016 | Blake | G06F 12/1027 |

OTHER PUBLICATIONS

PCT/US2016/028355, International Search Report and Written Opinion, dated Aug. 8, 2016, 10 pages.

* cited by examiner

*Primary Examiner* — Jaweed A Abbaszadeh
*Assistant Examiner* — Gayathri Sampath
(74) *Attorney, Agent, or Firm* — Stoel Rives LLP (57) ABSTRACT

A data processing device is configured to deploy, in response to an intermittent source of power, opportunistic power management strategies to manage harvested energy based on an expected amount of energy available to the data processing device and on expected energy expenditures defined by data processing and memory content control writing performed by the data processing device.

19 Claims, 5 Drawing Sheets

OPPORTUNISTIC POWER MANAGEMENT FOR MANAGING INTERMITTENT POWER AVAILABLE TO DATA PROCESSING DEVICE HAVING SEMI-NON-VOLATILE MEMORY OR NON-VOLATILE MEMORY

TECHNICAL FIELD

The present disclosure relates generally to power management techniques in data processing systems, and more particularly to power management techniques for systems powered by harvesting energy from intermittent sources of power.

BACKGROUND INFORMATION

Although power management has been an active field of research, the research effort has generally focused on system-level power management in general-purpose computing system paradigms premised on the availability of an uninterrupted supply of power. In contrast, embedded computing systems—such as smart monitoring data processing devices connected to an Internet of Things (IoT) network of other IoT devices—have specific challenges concerning intermittent availability of power, and managing data processing operations in view of diminishing availability of energy. For example, some IoT devices use energy harvesting, in which one or more of ambient heat, motion, or radio-frequency energy are used as an intermittent source of power. Energy harvesting offers an advantage in that harvesting machinery can be smaller than an internal battery, and it can provide energy indefinitely—far longer than the life span of a battery—provided that the intermittent source of power remains available.

Intermittent power often does not remain available. Although batteries and other types of energy storage used in conjunction with energy harvesting may extend the duration of the energy available, an intermittent source of power is still inherently unpredictable—a solar-powered device might be put in a drawer for months. For these reasons, energy harvesting has been attempted in a relatively narrow range of special-purpose devices that often include substantial energy storage designed to mitigate the challenges associated with intermittent availability of power. For example, some IoT devices include long-life batteries contributing much weight and bulk, which are undesirable attributes of wearables and other types of small sensor devices.

Thus, current small embedded systems using the paradigm of power management for general-purpose computing systems do not effectively manage computing and energy resources in the context of intermittent power for applications having predictable energy use.

SUMMARY OF THE DISCLOSURE

This disclosure describes a power management approach for optimizing performance in view of available energy, and thereby improve energy use for applications and systems, such as IoT applications and systems. Accordingly, disclosed are multiple opportunistic energy and power management techniques for working with harvested energy. The techniques are applicable to systems having internal non-volatile memory (NVM) or semi-NVM, allowing for improved management and reduced device size while avoiding external storage energy consumption. Additional aspects and advantages will be apparent from the following detailed description of embodiments, which proceeds with reference to the accompanying drawings.

DETAILED DESCRIPTION OF EMBODIMENTS

The disclosed opportunistic power management techniques generally track at least three values: estimated available energy (e.g., remaining from a harvesting episode), energy to advance (e.g., finish or transmit) data processing work (or simply, work), and energy to checkpoint the work, which may include checkpointing to memories with different energy transfer or write costs. The terms power and energy are used synonymously in this disclosure because the phrase "power management" is an industry phrase meant to refer to strategies of managing energy available to or consumed by an energy-consuming device.

The disclosed power management approach maintains counters for expected values of available energy, work energy, and checkpoint (or checkpointing) energy. And the disclosed power management scheme may track available energy from harvesting, energy needed to do work, and energy needed to checkpoint. These aspects are described briefly before discussing how they are used in combination in certain example embodiments.

The aforementioned three values are generally unpredictable, but in many common IoT applications some or all of the values are sufficiently capable of being characterized (i.e., known or predicted) so as to enable a controller to make informed power management decisions. Because IoT devices (or simply, IoTs) perform repetitive, application-specific tasks, a new power management paradigm is contemplated. Unlike the previous paradigm premised on the assumption of the availability of an uninterrupted supply of power, however, the disclosed power management paradigm is rooted in fairly well-characterized (i.e., repeatable) application behavior, having predictable (or at least bounded) energy use, such that the power management controller makes an informed decision about how to manage its available energy based on predicted (e.g., worst case) behavior of the aforementioned three values. Thus, for IoTs, speculating on the behavior of an application may be achievable with reasonably precise certainty, which helps facilitate the disclosed efficient power management techniques. For example, the canonical form of an IoT device may use the disclosed opportunistic power management techniques effectively because it has a fairly predictable execution model including a repeatable sequence of sensing, computation, and communication—which are broadly referred to as work.

More specifically, work is typically an ongoing process that proceeds in steps. For example, in some embodiments, work includes periodic collection of sensor data, calculation of incremental results, and communication with other devices. Work may be further divided into so-called fundamental work, such as reading sensor data, and into so-called derived work, which represents work that may be discarded and repeated without loss of input data, e.g., fully or partly processed results based on sensor data. (Note that not all sensor data need be considered fundamental. For example, a sensor device may have some intrinsic memory, or data may be resampled after an expiration time value, e.g., if it is not processed and transmitted immediately, expired data has no value anyway. In other embodiments, a portion of sensor data may be considered as fundamental, but obtaining supplemental, non-fundamental data is optional.)

Energy is what drives the work. Energy needed to do work may vary greatly. Sensor-reading energy varies greatly depending on the type of sensor and frequency of reading. Computation energy is more predictable. Communication energy, e.g., to power-up radios, may be unpredictable, and may be large. Further, transmitting only some of the data such as transmitting a portion of a packet may use energy but perform no useful work to the extent that a partly transmitted portion needs to be retransmitted in its entirety following an unsuccessful transmission resulting from a depletion of power.

When energy is plentiful, an effective power management strategy entails using low-energy volatile memory or cache. But when energy is scarce, as is often the case in embedded computing systems employing energy harvesting, an effective power management strategy saves results in semi-NVM or NVM. The terms semi-NVM and NVM, as used in this disclosure, mean types of memory that have some capacity to maintain, after experiencing a loss of power and for at least a period of time thereafter, stored information. In the case of semi-NVM, this type of memory provides some way to predict or detect that the stored information is fully or partly lost. Although the energy cost of a semi-NVM or NVM write is higher than that of a volatile memory, the lower volatility of semi-NVM or NVM reduces the risk of repeated work or data loss.

As noted, availability of harvested energy is by nature intermittent, so to avoid loss of data or repetition of work, partial work results are saved (so-called checkpointed) to non-volatile storage, e.g., an NVM. And when more energy then becomes available, steps of the work may be resumed from the checkpointed state.

Checkpointing may be implemented by saving partial results, but sometimes a checkpoint implies more than just saved partial results. For example, suppose two values A=0 and B=0 and two actions A=A+1 and B=B+1 are to be performed in that order. If the initial state (both A and B are zero) is checkpointed and a processor performs the two actions, then the state is A=1 and B=1. Any actions that follow that (more computations or computing derived results) will use those values. Suppose further there is a program counter (PC), which is PC=0 before the first action, PC=1 after executing A=A+1, and PC=2 after executing B=B+1. Now suppose the state is saved and restored (all of A, B, and PC are restored) and a process continues executing; the save and resume will then be invisible to subsequent processing steps. Similarly, if we execute A=A+1 (and PC=1) and then save and restore all changed states (A and PC but not B), then we can resume execution and it will be invisible to following code—at which point we can do another save (A, B, and PC as explained previously) and the presence or absence of the saves will be invisible. However, if we reach PC=2 and save A and PC but not B (or some other combination), then after restoring the state it will be inconsistent with any point in the execution (PC=0, PC=1, or PC=2). Thus, a checkpoint implies that a sufficient state is saved. Conversely, suppose that a next step is to compute C=C+1 but then no subsequent computation uses the result (e.g., C is reset to C=0 before any read of the modified result). In that case, it is correct to save and restore C but also correct to omit it. Note that the energy cost of saving all aspects of a state may be much more than the cost of making a checkpoint, so in some embodiments of checkpointing, the checkpoint state may be a small fraction of the entire state (e.g., under 10%). There may be trade-offs between the costs of checkpointing and restoring—a smaller checkpoint needs less energy but may require more computation after the restore, and careful placement of the checkpoint may reduce the checkpoint cost.

Checkpointing consumes energy and time, and thus reduces the amount of energy and time available for work, which may in turn degrade the quality of work. For example, with available energy that is not otherwise consumed checkpointing, sensors can be read, processed, and communicated more frequently. A goal, then, is to minimize overly conservative checkpointing. But, if checkpointing is skipped and power is depleted, then data that has been collected may be lost, so work that was done and not checkpointed may need to be repeated. Repetition may then ultimately consume more energy than if the work had simply been checkpointed.

Checkpointing energy depends on factors including the amount of data to checkpoint and the memory type. Notably, some memory types, such as flash, have high persistence but also high write energy. Other memory types, such as spin-transfer torque (STT) memory, can be designed with lower write energy but less persistence. Yet other memory types, such as complementary metal oxide semiconductor (CMOS) random-access memory (RAM), e.g., static RAM (SRAM), may have very low write energy but use continual (albeit very small) power to retain their state. Checkpointing energy may also depend on where the memory is placed. In some circumstances, it may be desirable to write the state to both NVM and CMOS RAM because even though CMOS RAM uses energy to retain the state, it is fast to read.

Another consideration is that it is often cheaper (in terms of energy expenditure) to store work rather than to communicate it. Nevertheless, memory storage capacity is typically limited, and data communication may have time constraints (e.g., if a goal is to collect real-time temperature data from various IoTs, then delaying communication interferes with that goal). Finally, there may be situations where energy is available but communication is not possible for environmental or other reasons. According to one embodiment, a data processing device application could prioritize work and communication, and the disclosed power management system may prioritize those tasks. In some situations, this may lead to multiple units of uncompleted work that are awaiting energy. For example, it may be desirable to delay derived work on earlier sensor data in order to collect and communicate up-to-date sensor data, (In this example, the older work is not simply discarded, as it is also useful to eventually complete the derived work.)

Figure 1:
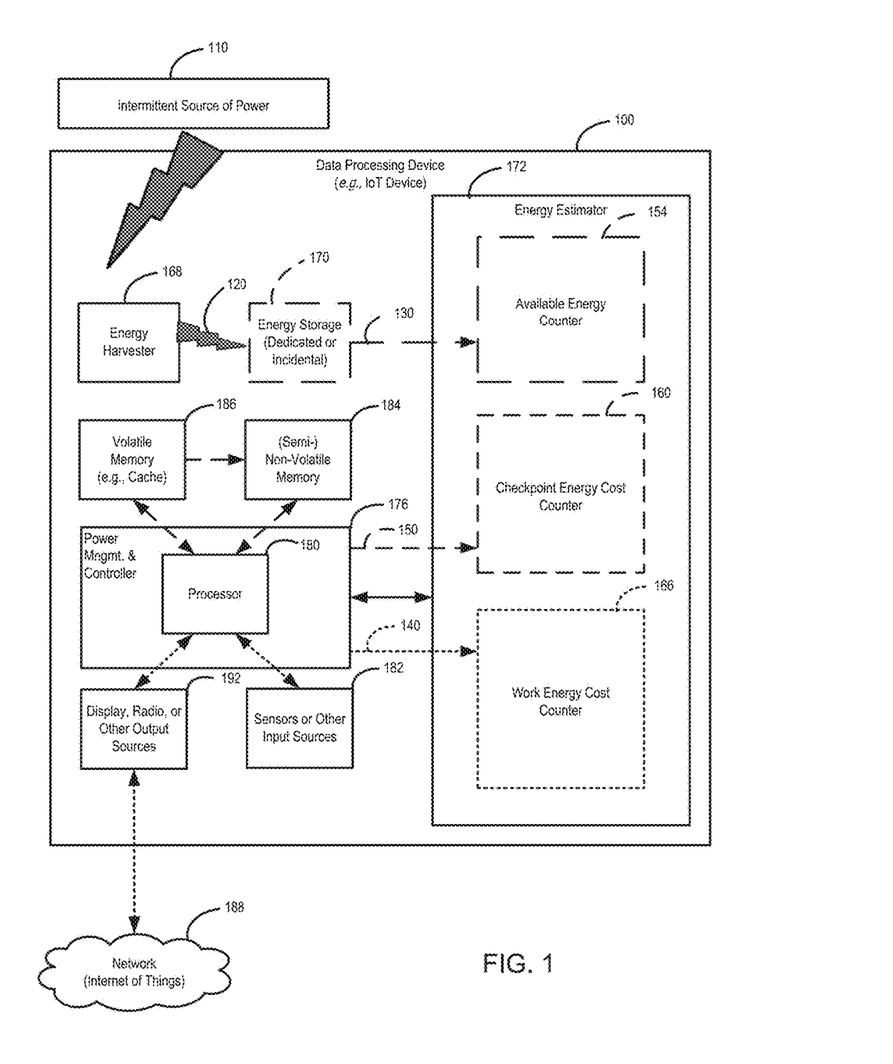
FIG. 1 is a block diagram of a data processing device by which one or more embodiments of the present disclosure may be implemented, according to a first embodiment.

FIG. 1 shows a data processing device 100 configured to deploy, in response to an intermittent source of power 110, opportunistic power management strategies (see, e.g., FIGS. 2 and 3) to manage harvested energy 120 based on an expected amount of energy 130 available to the data processing device 100 and on expected energy expenditures defined by data processing 140 and memory content control 150 performed by the data processing device 100. Initially, however, it is noted that FIG. 1 includes long, medium, and short dashed line types corresponding to information flows and operations associated with, respectively, an available energy counter 154, a checkpoint energy counter 160, and a work energy counter 166. These line types and direction of flows, however, are simply illustrative. Other information flows and operations are contemplated as well and are, therefore, within the scope of this disclosure.

An energy harvester 168 is configured to provide to the data processing device 100 components the energy 120 harvested from the intermittent source of power 110. Examples of the energy harvester 168 include a photovoltaic cell, a thermoelectric generator driven by a heat source, a device for capturing mechanical or vibrational energy (e.g., a pendulum), or a radio-frequency (RF) energy harvesting device. FIG. 1 shows energy arrives and is available for some (small) energy storage 170.

An energy harvesting system gathers environmental energy (energy outside the data processing device) that may be accidental (such as periodic light on a photovoltaic cell) or intentional (such as energy broadcast to power nearby devices). Harvesting may include energy storage such as a small battery or capacitor, which can be charged from harvesting, so as to make available energy more predictable. A simple case is no predictability and no storage, but some systems could have some predictability. For example, once a room light goes on, it often stays on for minutes at a time, or once a capacitor is charged above some level, it may reliably provide one microsecond (μsec) of energy, which may be sufficient for powering a processor to perform certain work or checkpoint a selected state.

An energy estimator 172 is configured to determine the expected amount of energy available 130 to the data processing device 100 as well as the expected energy expenditures 140 and 150. It does so by keeping the counters of available energy for the data processing device 100, checkpoint energy cost, and work energy cost, which are used by power management logic (e.g., a controller 176, which may include or be separate from a processor 180) to direct how the available energy contained within the energy harvester 168 or the energy storage 170 will be used.

In some embodiments, the energy estimator 172 is configured to determine the expected amount of energy available to the data processing device 100 by anticipating a lower bound of future energy available from the energy harvester 168. As an example, in a photovoltaic source designed to operate outdoors, it may be anticipated that a passing bird or plane still allows some ambient light to reach the panel, and that the sun sets over minutes or hours and not instantly, and so the energy from the panel at any given time may be used to predict energy from the panel for many microseconds or even milliseconds. As another example, thermoelectric devices have physical mass, and so there is some largest rate at which the temperature can change (without the rate being so great as to damage the data processing device, e.g., dropping a hot device in ice water can induce a high rate of change but also is likely to shatter the data processing device due to thermal stress). Because the change rate is limited, the electrical output at any given time can be used to predict the near-term future electrical output.

Available energy counter 154 values may be estimated according to a number of techniques. For example, estimates may be based on a predetermined period of time after which a voltage of a darkened photovoltaic panel falls below its operative output voltage level. In another embodiment, estimates are based on a known thermal mass and maximum rate of induced temperature change (e.g., the data processing device is not expected to keep working if dropped in sub-freezing liquid). In some other embodiments, estimates are based on a measure of an existing voltage of the transient energy storage 170, such as a capacitor dedicated for purposes of providing a small energy supply or incidentally (i.e., unintentionally) provided by other (power supply) circuitry.

In some embodiments, energy storage 170 is optional. In other embodiments, there may be energy storage having stored energy that is counted toward the energy estimator. The energy storage may be incidental or dedicated. For example, a conventional photovoltaic panel operates over a wide range of voltages, some so high as to damage ordinary integrated circuits. It is typical, therefore, to build for such circuits a system including a voltage regulator, which is circuitry that allows the input voltage to vary over a wide range while keeping the output voltage (which feeds the sensitive integrated circuits) within an acceptable range of voltages. The voltage regulator may vary in design, but one common type includes energy storage in both capacitors (electric fields) and inductors (magnetic fields), and it is often desirable to use energy storage much larger than the circuit's instantaneous needs so that the voltage regulator's transistor switches less frequently, as less-frequent switching improves the regulator's efficiency. Thus, while the voltage regulator's energy storage is available following a power loss, this disclosure refers to that kind of energy storage as incidental storage rather than dedicated. Other embodiments can also use dedicated storage that is specifically intended to supply energy in the event of a power loss.

Estimates may also be based on a pattern of available energy use learned by the data processing device 100. And in cases with well-defined environments and power usage models, estimates may be known values that are initially preprogrammed or established empirically by a system designer. In general, there are at least three approaches for implementing energy estimators and estimation techniques.

The first approach is generally externally focused. This approach is useful when an intermittent power source provides somewhat predictable power and has operating parameters that are known so that an energy estimate may be readily established. For example, a computer's ambient temperature operating range provides the following pertinent analogy. When a systems designer designs a computer (e.g., either the circuitry components inside or the entire computer system assembly), the designer may specify the computer's ambient temperature tolerance, such that the computer would function in an ambient temperature range from, say, for example, a freezing ambient temperature to a 100 degree Fahrenheit ambient temperature, or that the computer may retain its stored memory contents when powered off in an ambient temperature range from −40 degrees to boiling. In an analogous way, then, the energy harvester 168 will also typically have some (analogous) specified design and operating parameters. For example, a photovoltaic panel may be sized to provide energy under a range of environmental conditions (but not very low light), and it may be de-rated at ambient temperatures exceeding 60 degrees Celsius. Accordingly, estimates of available energy may consider such external factors of the panel's operating environment. For example, a solar panel device for outdoor use may experience sudden dimming (e.g., a bird or plane flies over the solar panel) but may still continue to produce some power from indirect or scattered light. In such a case, the energy estimator 172 may predict changes in available energy attributable to sunsets occurring over the course of an hour, but it may optionally ignore sudden changes attributable to birds or other intermittent power disruptions. In contrast, the same panel, when used indoors, may receive light from lamps that are frequently turned on or off, and useful energy from the light's bulb changes almost instantly. In this case, the energy estimator 172 may be sensitive to such rapid changes in the voltage output of the panel.

The second approach is generally internally focused. Under this approach, the energy estimator 172 considers in its prediction certain factors attributable to the optimal energy storage 170. Note, however, that the energy storage 170 may be miniscule compared to standard batteries because the energy storage 170 may be incidental to the overall design—e.g., capacitance inherent in a power supply or capacitance in wires. But so long as the energy storage 170 has a storage capacity capable of some characterization, ether by design or by measuring voltage or some other transient energy supply (magnetic field, electric field, or other attribute), then the available storage energy may be estimated.

Also, as an aside, it is notable that estimates discussed herein represent an amount of work, and not some arbitrary relative measure of a level of energy. For example, to use another analogy, a car gas tank may be equipped with a conventional fuel gauge. The conventional fuel gauge measures gallons or liters of fuel remaining, representing possibly hours of driving time. If fuel is determined to be low, then a lamp is it on an instrument panel, irrespective of the work expected from the engine. In contrast, the energy estimator 172 according to the disclosed opportunistic power management scheme expresses its prediction of available energy in terms of work. To employ again the foregoing analogy, the prediction is based on a number of drops of fuel remaining that may be used to obtain at least 500 revolutions from the car engine (in which case, a power management decision might well be to keep the car engine active and doing work), or less than 500 (in which case, the decision might be to disconnect the engine so that the car can coast, and then switch off the engine and wait for more fuel to appear).

Finally, the third approach uses a combination of the first and second approaches. In other words, to use the previous analogy, if there are 200 stored drops of fuel and another 400 drops are expected to arrive based on refueling history of proximity to a refueling station, then those amounts are counted together as 600 drops of available energy, resulting in a decision to keep the engine running, even though neither harvester nor storage alone reaches the 500-drop threshold.

A controller 176 manages several energy consumers, including a processor 180. The processor 180, operatively associated sensors 182, and other energy-consuming data processing elements are generally considered by the controller 176 as things that do work and consume energy, where work is generic—reading the temperature using the sensors 182 is not necessarily the same as computing a derived result, but they can be considered as substantially similar in some power management scenarios. Control over the NVM or semi-NVM 184, however, is treated separately from data processing elements because the NVM or semi-NVM 184 represents an alternative course of action in terms of what the controller 176 will ultimately control. In other words, the controller 176 decides, given the current or predicted energy, whether the processor 180 will do work, waft for more energy to arrive, or save its state so that earlier work is not lost.

According to another embodiment, a data processing device includes a controller having an integral energy estimator that is configured to estimate the first and second expected energy expenditures based on, respectively, previous data processing and memory writing performed by the data processing device. The controller 176, processor 180, or related circuitry may be separate devices, or part of the same device. For example, in the two use case examples discussed below, the first use case includes a controller integrated with the software running on the data processing device. In the second use case, a controller is defined in terms of pseudo-code, but it could be implemented as logic circuits, and it could be included in the processor, deployed as a separate device, or physically distributed. Similarly, logic to enable temperature sensing could be placed within a sensing element, logic to enable data processing could be within a processor, logic to enable checkpointing could be within a persistent memory element, and so forth.

The processor 180 is configured to perform a data processing operation having a first expected energy expenditure 140. For example, it is common when designing microprocessors to design or characterize the maximum energy that can be consumed by any machine-executable instruction with any input parameters at any operating point (voltage, temperature, or other operating parameter). Accordingly, in some embodiments, the expected energy can be conservatively estimated as that worst-case energy lost.

The (semi-)NVM 184 is available for checkpointing. The NVM 184 is a type of memory storage device capable of maintaining, after the data processing device 100 depletes its energy available, data written to the memory storage device in connection with a memory writing operation. The maintaining and memory writing operations have the second expected energy expenditure 150, which may be predicted, for example by knowledge of the memory design and perhaps additional information such as the amount of state information to write, or operating parameters such as temperature and voltage. Note that writing the data in the memory is a first source of memory energy consumption (e.g., scrubbing), transferring the data from a volatile memory 186 to the storage memory 184 is a second source of memory energy consumption, and accessing one memory so as to copy its contents to another memory is a third source of memory energy consumption. Such memory operations are generally referred to as memory content control.

FIG. 1 also shows the processor 180 connected to the volatile memory (e.g., cache) 186, which in turn is connected to (semi-)NVM 184. This reflects a system structure having a cache. Based on the available energy, the controller 176 may indicate the processor 180 should either (a) write normally to the cache 186 and continue work thereafter, (b) evict entries from the cache 186 into the less-volatile memory, (semi-)NVM 184, or (c) perform storage operations for data that is sure to go to the less-volatile memory 184 (perhaps bypassing the cache 186, or updating both the cache 186 and also the less-volatile memory 184). Additional details of an example of caching behavior are described in the description of the second use case example.

According to one embodiment, the controller 176 is configured to: compare the expected amount of energy 130 available and the first and second expected energy expenditures 140 and 150; and select, based on the comparing, a power management strategy from among the opportunistic power management strategies including continuing a partly completed data processing operation, writing to the memory storage device 184 or 186 a checkpoint representing data associated with the partly completed data processing operation for potentially resuming the partly completed data processing operation after additional harvested energy 120 is available to the data processing device 100, and entering a reduced-power consumption state (e.g., an idle state or a low-power work state) for allowing additional harvested energy to become available.

The selection of which power management strategy may be automatically determined by the controller 176's assessment of energy factors. And in some embodiments, the controller 176 may leverage a threshold value that prioritizes energy consumption based on data management. Examples of these threshold values include adding extra information about the criticality of some data or operation that prioritizes work associated with the data or operation. For example, if more (or less) than a certain number of samples are transmitted to a network 188 using an output source communications module 192 (e.g., transceivers and transverters that allow re-scaling according to physical or physics constraints), then the priority of transmitting further work will drop (or rise) accordingly. In another embodiment, if more (or less) than a certain percentage of data is maintained in NVM storage, then the priority of data transfer from the volatile memory 186 to the NVM 184 can drop (or rise) accordingly. In some embodiments, if the sensed (or computed) data is identified as critical, it may be allocated for immediate checkpointing. The criticality of the data, or similar data flow threshold factors, may be set in response to a designer, programmer, or user defined thresholds or comments concerning data management. Thus, the power management strategy may incorporate both energy and data flow factors.

In another example, if energy is scarce, such that transmission intervals are highly sporadic or memory starts to fill (which could be either volatile or non-volatile memory depending on past energy patterns, memory costs, and power management decisions), then a strategy may be to note that more than some fraction of memory contains saved-but-not-transmitted data. The threshold of saved-but-not-transmitted data may then be used to choose a different power management strategy, for example, to spend less energy on saving sensor values to NVM (and thus capturing fewer sensor data points), and using the resulting energy savings for transmitting a larger total amount of data or for transmitting data sooner. In this example, an application or system designer can readily articulate trade-offs (via the threshold) without developing a thorough understanding of a tailored power management system, and thereby use a more generic power management system to provide efficient power management without extensive customization to the specific system or application.

Figure 2:
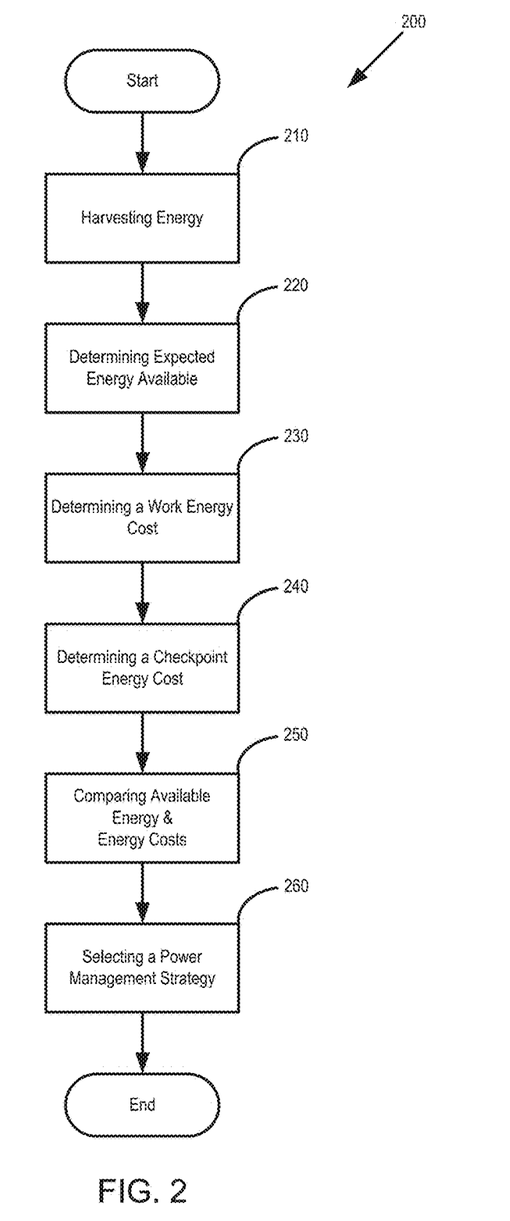
FIG. 2 is a flow diagram showing a method of deploying power management strategies.

FIG. 2 shows a method 200 performed by a device for deploying, in response to an intermittent source of power, opportunistic power management strategies based on an expected value of energy available to the data processing device and on energy costs associated with data processing work and memory content management operations performed by the data processing device.

The method 200 initially includes harvesting 210 energy from the intermittent source of power.

The method 200 includes determining 220 the expected value of energy available to the data processing device. For example, the determination 220 may include estimating the number of microseconds for which the harvesting power will be above some threshold, or it may include measuring the number of Joules of energy in some short-term storage.

The method 200 includes determining 230 a work energy cost associated with working on a sequence of data processing work. The work energy cost may be attributable to the collection of sensor data, the computation of processed data associated with the sensor data, or the communication of processed data to another device through a network connection. For example, the work energy cost may include reading a sensor for temperature, acceleration, or some other metric that has a predictable upper-bound energy cost based on the sensor design. It might include scanning of keyboard switches and other user inputs. It may include an application performing work in groups of machine instructions, such that an upper-bound estimate may be obtained by multiplying the set of the largest group by the highest-known cost of a single instruction. The work energy may also include energy used to transmit over a wire or through air, which may be bounded by the design of the transmission circuitry.

The work energy cost may be further refined by operating parameters. For example, the energy cost of some circuits depends on their temperature and the applied voltage. Measuring these parameters, therefore may yield more accurate energy estimates.

In some cases, the work may be unreliable. That is, reading a sensor might produce no result, or the transmission may be dropped. When the system is robust against these sorts of errors, however, an optimistic estimate technique may be readily employed. If the energy expected to be used for the work is greater than the amount of energy available, then the work event is treated as an error. For example, if a transmission usually takes 10 microjoules ($\mu J$) but due to transient noise the energy rises to 50 $\mu J$, then a system with only 20 $\mu J$ available for transmission may stop transmission after 10 $\mu J$ are expended but before 20 $\mu J$ are expended and thus allow the transmission to fail, while still maintaining other needed energy reserves.

The method 200 includes determining 240 a checkpoint energy cost associated with writing to a memory storage device during a memory writing operation configured to maintain, while the data processing device is depleted of energy available, the processed data. For example, if the cost to checkpoint a cache line to NVM or semi-volatile memory is 10 nanojoules (nJ) and there are seven modified lines, then the checkpoint cost is 70 (7*10) nJ. If the work modifies another cache line, then the checkpoint cost rises to 80 nJ.

The method 200 includes comparing 250 the expected value of energy available and the work and checkpoint energy costs.

The method 200 includes selecting 260, based on the comparing, a power management strategy from among the opportunistic power management strategies including: continuing the sequence of data processing work, checkpointing in the memory storage device an incremental result of the processed data, and waiting for additional harvested energy to become available.

Figure 3:
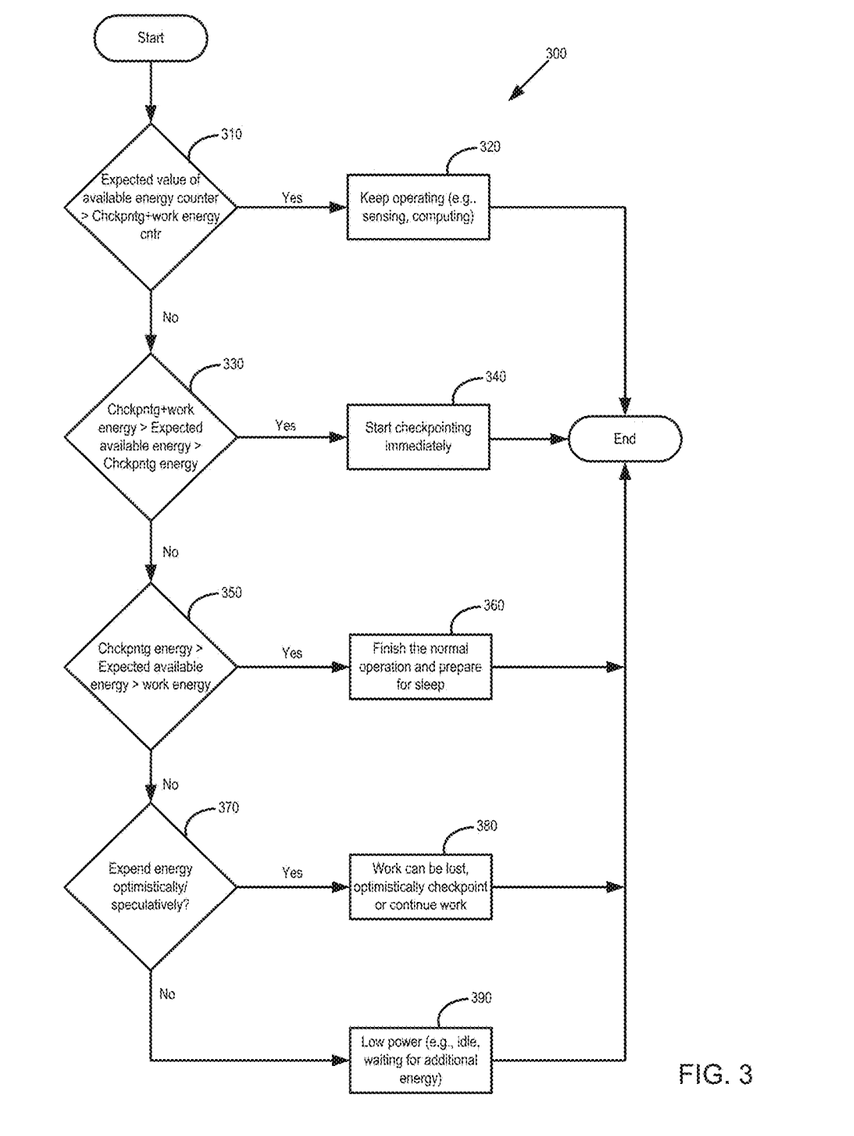
FIG. 3 is a flow diagram showing a method of selecting a power management strategy.

FIG. 3 shows an embodiment of a method 300 for selecting a power management strategy. This method 300 shows how the checkpointing counter and the work counter, as well as the energy-estimation counter, are consulted during a data processing operation.

At element 310, if the expected value of available energy is much more than work+checkpoint energy, and if several work steps are available, the method 300 may perform 320 multiple work steps per checkpoint. This reduces the amortized cost of checkpointing.

If a work step is fundamental rather than derived, the method 300 may perform the work and then checkpoint, even though enough energy is expected to complete more work. Checkpointing consumes energy but avoids data loss of fundamental work if the expected energy does not materialize. If the expected value of available energy is more than enough (or energy storage is available and already contains more than enough energy), work proceeds without checkpointing the fundamental data but reserves enough energy such that either the fundamental or derived work (once it becomes available) can be checkpointed. In the optimal case, this avoids checkpointing energy and allows that energy to be used for work or communication; at the same time, if expected work does not materialize, then the stored energy ensures checkpointing can be done and no data is lost.

At element 330, if an expected value of available energy is greater than checkpoint energy and less than the sum of work and checkpoint energy, the method 300 may start checkpointing 340 and continue working in anticipation of more harvested energy becoming available. If there is not sufficient energy to finish a process, it will be checkpointed and the data processing device will go to sleep. Multiple sleep modes can be established. Based on the speculated sleep time and the amount of energy left, different sleep modes can be selected.

At element 350, if an expected value of available energy is greater than work energy but less than checkpointing energy, then the method may finish 360 the work and does not checkpoint. For example, if energy storage is available, then the method 300 may stop performing work and wait until energy appears, which avoids doing and then discarding work, so is often more efficient.

At element 370, the expected value of available energy is less than checkpoint energy, so at element 380 the system could either work or start checkpointing, while expecting additional harvested energy to appear. And at element 390, the method instead enters its idle state instead of beginning additional work or checkpointing.

Figure 4:
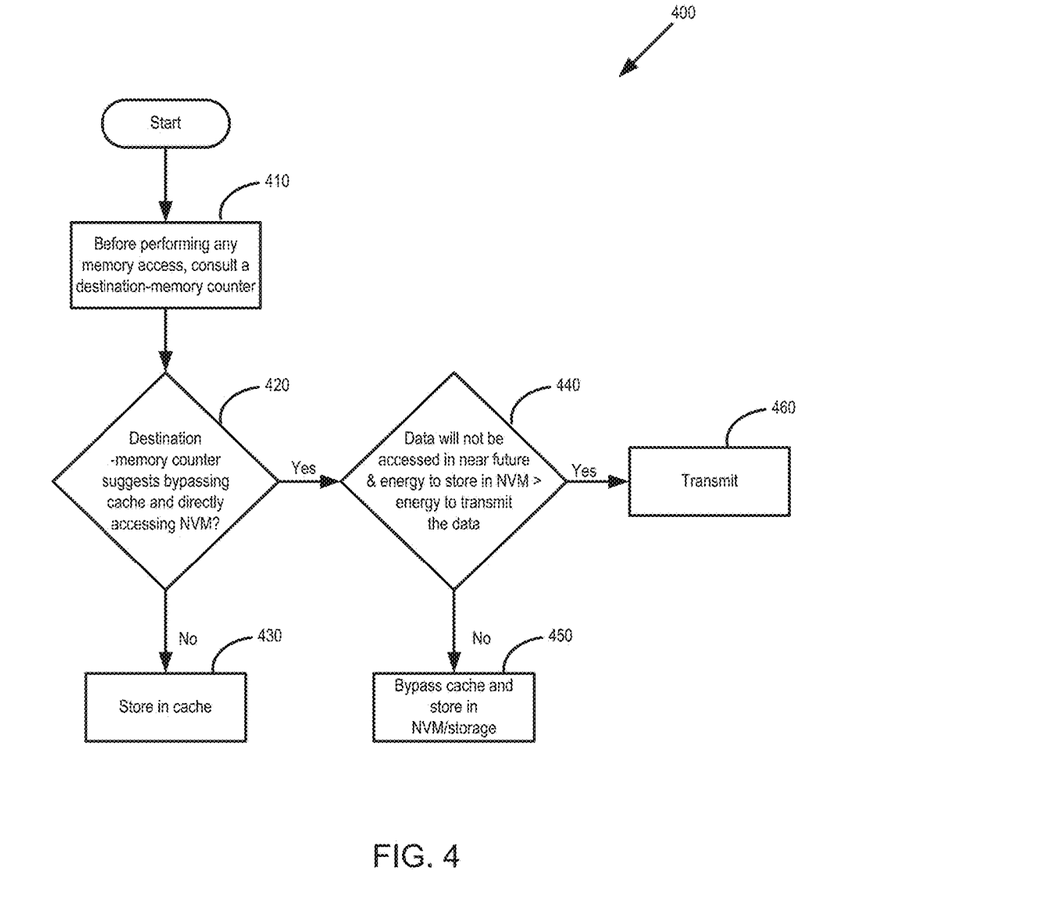
FIG. 4 is a flow diagram showing a method of efficient memory accesses according to a power management strategy.

In general, software-managed memory is typically challenging for general-purpose computing environments. But IoTs may have very specific workloads, in which case software-managed memory is made more practical. Accordingly, FIG. 4 shows a method 400 of efficient memory accesses. This method 400 shows how data is stored within an optimal destination: cache, NVM, or transmission.

Initially, the method 400 includes consulting 410 a destination-memory counter.

The method 400 includes an element 420 at which point it is determined whether the data is going to be accessed again soon. If so, then it probably should be in cache at element 420. The destination-memory counter identified in element 420 is a unit that predicts whether the data can be used again soon (i.e., it needs to be stored in volatile memory) or it will not be accesses in the near future (i.e., the data bypasses the cache to be stored in NVM storage).

If cache is bypassed at element 420, then element 440 considers whether the data is not going to be accessed soon but may need to be conservatively handled so as to avoid data loss (e.g., this is the final result). In this case, the cache is bypassed and the data is stored in NVM at element 450. Element 440 also evaluates whether, if due to certain circumstances, transmitting the data takes less energy than storing the data. In that case, the data is transmitted at element 460.

Note that storage energy is both the write energy and the maintenance energy (e.g., due to periodic refresh or scrubbing), for example, a spin-transfer torque random access memory (STT-RAM). STT-RAM can be designed to be semi-non-volatile, and thereby improve write performance and write energy consumption. Semi-non-volatile STT-RAM, however, may use frequent scrubbing and potential correction, which regularly consume power. This impacts the overall checkpointing energy. And if the array is not scrubbed regularly then it needs to have extra error correction code (ECC) to be able to correct potential accumulated errors. Depending on how long the checkpoint data is expected to stay in the memory, a stronger ECC will be selected. The ECC strength depends on the length of the period that the array is out of scrubbing power. Stronger ECC increases the expected checkpointing energy. Thus, there are trade-offs between energy cost to maintain a semi-volatile memory and how volatile it is. For any such type of memory, the data processing device would include the ongoing costs and the one-time costs. For example, if it is 10 nJ to write the initial checkpoint and an additional 20 nJ to maintain it for an hour (or whatever time period), then the data processing device should reserve 30 nJ for the checkpoint, and not just the 10 nJ needed to write it initially. The longer the checkpoint data is expected to stay in the memory, the larger the value of checkpointing energy that should be allocated. These checkpoint energy factors may be used to adjust the proposed power management strategy between using NVM and semi-NVM.

In other embodiments, if some data loss is acceptable to the application, a power management strategy may be to tolerate data loss but avoid the cost of increased scrubbing rates or ECC. In some systems, data has some time value, and so older, expired data need not be transmitted. Therefore, some loss of older data may be acceptable. At the same time, in many practical semi-volatile memories, including STTs, a significant reduction in energy use can be achieved with a modest reduction in data longevity. Thus, where some loss is tolerable, changes to data retention and longevity may be an added factor in power management. For example, a data processing device may stop scrubbing after some interval, accepting the corresponding data loss.

There may be memories with different amounts of volatility and energy cost to write them. For example, one memory may have a lower energy cost but is more volatile. This may be managed by the controller in at least two ways.

First, if some work is designated as non-recoverable, then it should be checkpointed to the high-energy memory. If work derived from the value is lost, then the work may be repeated. The derived work may safely be checkpointed to the more-volatile but lower-energy memory.

Second, repeating a lot of work is itself energy-consuming. Thus, even if work could be repeated, it is undesirable to do so. Thus, it may be desirable to perform some amount of work that is checkpointed at low reliability and then, after some threshold, perform a more-reliable checkpoint. If a less-reliable checkpoint fails, then there is less work that needs to be re-executed.

Note that for completeness the references to different memories could mean physically different kinds of memory or the same kind of memory but a more redundant state is written, which takes more energy but improves the chance of recovery after errors.

Figure 5:
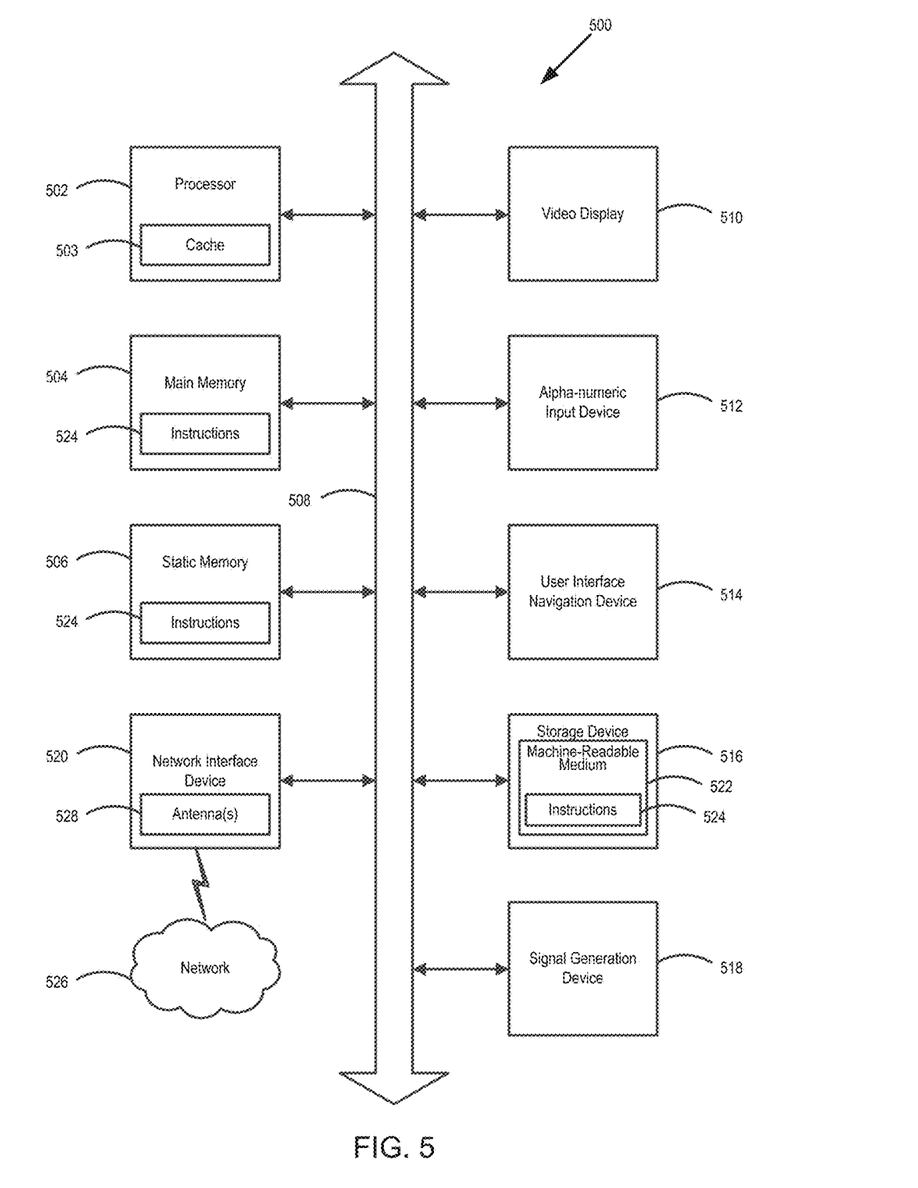
FIG. 5 is a block diagram of a data processing device by which one or more embodiments of the present disclosure may be implemented, according to a second embodiment.

FIG. 5 is a block diagram illustrating an example machine upon which any one or more of the methods herein discussed can be run.

In some embodiments, the machine operates as a stand-alone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC); a tablet PC; a set-top box (STB); a Personal Digital Assistant (PDA); a mobile telephone; a web appliance; a network router, switch, or bridge; or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methods discussed herein.

Embodiments of the machine may include programmable devices such as appliances, advertising, agricultural, control or actuation devices, damage or failure monitoring (chemical, force, thermal, etc.), environmental monitoring (including seismic and weather), food safety, industrial process monitoring, medical, motion detection, security or gunshot monitoring, navigation, robotics, scientific research and sensing, vehicle controls, voice, and weather devices. Other embodiments may include non-programmable devices including non-programmable versions of the aforementioned devices or separately powered sub-systems of the devices.

Example computer system 500 includes a processor 502 (e.g., a central processing unit (CPU) optionally having a cache 503, a graphics processing unit (GPU) or both), a main memory 504, and a static memory 506, which communicate with each other via a bus 508. The computer system 500 may further include a video display unit 510, an alphanumeric input device 512 (e.g., a keyboard), and a user interface (UI) navigation device 514 (e.g., a mouse). In one embodiment, the video display unit 510, input device 512, and UI navigation device 514 are a touch screen display. The computer system 500 can additionally include a storage device 516 (e.g., a drive unit), a signal generation device 518 (e.g., a speaker), a network interface device 520 (which may include or operably communicate with one or more antennas 528, transceivers, or other wireless communications hardware), and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methods or functions described herein. The instructions 524 can also reside, completely or at least partially, within the main memory 504, static memory 506, or within the processor 502 or its cache 503 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, or associated caches and servers) that store the one or more instructions 524. The term "machine-readable medium" shall also be taken to include any tangible medium that is capable of storing, encoding, or carrying instructions for execution by the machine and that cause the machine to perform any one or more of the methods of the present disclosure or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include SIT-RAM or NVM, including, by way of example, semiconductor memory devices (e.g., Electrically Programmable Read-Only Memory (EPROM), Electrically Erasable Programmable Read-Only Memory (EEPROM)), and flash memory devices, magnetic disks such as internal hard disks and removable disks, magneto-optical disks, and CD-ROM and DVD-ROM disks.

The instructions 524 can further be transmitted or received over a communications network 526 using a transmission medium via the network interface device 520 utilizing any one of a number of wed-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, 4G LTE, LTE-A, or WiMAX). Other applicable communications technologies include Bluetooth, Bluetooth LTE, near-field communications (NFC), sub-centimeter, and sub-millimeter communications. The term "transmission medium" shall be taken to include any intangible medium that is capable of storing, encoding, or carrying instructions for execution by the machine, and includes digital or analog communications signals or other intangible medium to facilitate communication of such software.

OVERVIEW OF USE CASE EXAMPLES

Two example use cases are set forth as follows. Use case example no. 1 is fairly self-contained. It shows power management integrated with all device activity. This can be thought of as a tiny device or embedded use case (e.g., consistent with the data processing device 100, where simplicity is an important consideration). Use case example no. 2 describes a power management routine but not the application code because the application is ordinary code and need not be coded in any particular way to take advantage of power management. This latter use case example assumes hardware support in the form of a cache and a count of the number of modified cache lines. The second use case example may be thought of as a general-purpose device use case (e.g., for the computer system 500). In short, use case example no. 1 includes all parts in the sense that it is a full example of the system, whereas use case example no. 2 shows the energy management control loop but not the application running on the data processing device.

Use Case Example 1

This example could be hardware, software, or some combination of the two. If viewed as software, then instruction code (software) includes energy decisions explicitly—that is, pre-existing software may be tailored to include the energy decisions. The example assumes the following components: a radio, a temperature sensor, a non-volatile queue, and a volatile queue.

The energy consumed by each component is as follows, in the order of low (least energy) to high (most energy): push (or pop, i.e., push/pop) from volatile queue-assumed to have zero energy cost to simplify the example; push/pop from non-volatile queue-assumed to have a zero energy cost to simplify the example; read from temperature sensor; keep data in volatile memory (i.e., storage or scrubbing cost); and transmit temperature sample on the radio. All other energy costs are assumed to be zero to simplify the example. In a practical system, there are other components that use energy, such as a so-called data processing engine (hardware or software module) executing process described herein. A practical system implementation either could be designed to include these costs explicitly or could include some guard band that leaves some margin of available energy tolerance.

In this example, a goal of the device is to read temperatures at one millisecond (msec) intervals. If there is insufficient energy to do that, then it is acceptable to slip the temperature sensor read time until there is additional energy available.

Ideally (that is, with large amounts of energy available) the sensor values can be read and then the radio may simply transmit them without prioritizing or managing the energy available. If there is insufficient energy to immediately transmit, however, then the sensor values are queued. The device may start by queuing them first to volatile memory, but if available energy is especially low—and because the device cannot guarantee a time between opportunistic energy bursts—the device may sometimes copy them to NVM.

Temperature samples are sent in the order they were collected; if there are entries in both volatile and non-volatile queues, then the non-volatile queue entries are older than the volatile queue entries.

In this example there are two processes. A first process reads the sensor and queues to volatile memory (Table 1). A second process reads from the volatile queue and either transmits or saves to NVM (Table 2). These processes are high level and include some assumptions.

It is assumed that each piece of work or memory manipulation action updates the associated counters. For example, a sensor read uses energy, so the work energy counter will be decreased. (Pseudo-code in Table 1 does not explicitly decrement it.) In this example, the checkpoint energy counter is constant, and reflects energy lost to checkpoint one item. The work energy counter is sub-divided into energy cost to read the temperature sensor and the energy to transmit a sample. The work energy counter values, however, are constant, although in a more complicated example they can vary. For example, the cost to transmit may vary depending on the amount of data to transmit or channel conditions.

To simplify the description, this example assumes an infinite-size queue and ignores queue overflow. In practice, queues are of finite size. Accordingly, an actual implementation might skip a queue save if the queue is full, drop the oldest entry when a new sample is available, or signal some kind of event, e.g., transmit an indicator for dropped data.

With the aforementioned assumptions in mind, here is pseudo-code representing a process to read the sensor:

TABLE 1

```
time = now( )
loop:
    if energy.available < energy.work.read_temp +
    volatile_queue.entries *
    energy.checkpoint:
        sleep(5 μsec)
        goto loop
    temp = sensor.temperature( ) //read sensor
    volatile_queue.push(temp)
    time = time + 1 msec
    if time < now( ):
        time = now( ) + 1 msec
    sleep(time)
    goto loop
```

Note that the device sometimes depletes its available energy. When energy becomes available again, the process starts at the top. When there is insufficient energy to read the sensor, the device sleeps until more energy is accumulated, and then it tries again. This example also avoids reading the sensor if there are entries in the volatile queue and there is insufficient energy available to both read the sensor and checkpoint all the queue entries. This avoids spending energy to collect samples, which might then be lost due to lack of energy. In other words, it avoids spending energy on work until it is likely the work will ultimately be useful. But when there is sufficient energy, the process will read the temperature and enqueue it for the process of Table 2.

To advance the sensor-read timing so as to maintain 1 msec sample-read intervals (i.e., a goal time interval), a "time" timer variable is modified. The timer variable is used because the process may have gotten behind because the device lacked energy (it supped), and so the goal time is then corrected.

Finally, the process may sleep unto the goal time.

Here is pseudo-code representing a process to transmit data:

TABLE 2

```
e_read = 25 * energy.work.read_temp
loop:
    e_checkpoint = volatile_queue.entries * energy.checkpoint
    if energy.available > energy.work.transmit + e_checkpoint +
    e_read:
        // enough energy to both transmit and do other work
        if nonvolatile_queue.entires > 0:
            temp = nonvolatile_queue.pop( )
        else if volatile_queue.entries > 0:
            temp = volatile_queue.pop( )
        else:
            volatile_queue.wait_for_data( )
            goto loop
        radio.transmit(temp)
        goto loop
    else if energy_available > e_checkpoint + e_read:
        // not enough energy to transmit; there is enough energy to
        checkpoint
        // plus enough to do several reads, no need to checkpoint yet
        sleep(5 μsec) // wait for more energy to arrive
        goto loop
    else if volatile_queue.entries > 0 and
    energy.available <= e_checkpoint +
    energy.checkpoint:
        // running very low on energy, checkpoint to non-volatile queue
        temp = volatile_queue.pop( )
        nonvolatile_queue.push(temp)
        goto loop
    else:
        sleep(5 μsec) // wait for more energy
        goto loop
```

In this example, the device seeks to transmit data if doing so still leaves enough energy to both read at least 25 more temperature samples and checkpoint anything in the volatile queue. Otherwise, the device will wait until more energy arrives.

If there is enough energy to transmit, then the device always transmits first from the non-volatile queue, i.e., the oldest samples, first-in-first-out (FIFO).

If no samples are available, then the process will wait for data to arrive. However, the device does not transmit immediately when data arrives, as the available energy may have gone below the transmit threshold while waiting (e.g., consumed by the Table 1 process).

If there is not enough energy to transmit but there is plenty of energy to read the temperature sensor several times, then data in the volatile queue will remain there in order to avoid incurring the energy cost of checkpointing the data to the non-volatile queue.

If the available energy is low, then the process will seek to checkpoint items from the volatile queue into the non-volatile queue. Checkpointing is a precaution to avoid loss of volatile data, but it is desirable to avoid repetitious checkpointing because the energy expended checkpointing could have been used for useful work. The computation "energy.available<=e_checkpoint+energy.checkpoint" has the term "+energy.checkpoint" to allow for cases where, for example, 10 picojoules (pJ) is a guard band threshold and an amount of one checkpoint such that, with 25 entries, "e_checkpoint" is 250 pJ, and the process will seek to start checkpointing when the energy available is less than 260 pJ.

Finally, the process waits for more available energy.

The constant 25 in the example represents a prediction about the arrival of more energy. Another example may include "prediction( )" instead of a formula with a constant of "25". The number "25" is chosen arbitrarily for the example, but consider what happens with a smaller or larger number. A smaller number represents holding a smaller energy reserve for reading samples; when energy is low, it can transmit samples sooner but is more likely to run out of energy entirely and thus stop collecting samples. Conversely, a larger number represents holding more energy in reserve to collect samples, but, as a result, it more often needs to wait for more energy to arrive and build a larger reserve; the larger reserve means samples can be collected over a longer gap in harvested power, but any delay caused by building the reserve also delays transmission. To avoid trade-offs between large and small reserves, a typical implementation would likely use a more sophisticated prediction approach that adapts according to recent energy patterns. For example, if the device frequently runs out of energy, then it would increase the energy reserve that is allocated before transmitting; if the device rarely runs out of energy, then it would decrease the reserve allocated. A slightly more general point is that predictions can be based on the available energy, pending work, and checkpoint energy. This allows the power management to be more sophisticated about how it spends energy, rather than just running to depletion.

A simple approach is to run until all energy is exhausted. A simple power management strategy using available, commit, and work counters is a so-called greedy strategy that does work whenever there is energy available, and if not, then the device waits for more energy before starting more work. In prior attempts without counters, a greedy approach would simply try to perform work irrespective of whether there is sufficient energy available to complete it. This improved greed strategy is more efficient than prior attempts because it avoids starting work that would run out of energy mid-way and thus waste the energy spent getting to mid-way.

The strategy in this example is more complicated than the simple one because it uses prediction: it predicts that when energy runs low, sometimes more energy will arrive before the low energy runs out, and thus it is sometimes worthwhile to avoid spending radio energy in order to have an energy reserve to keep collecting samples until more energy arrives to run the radio.

Use Case Example 2

In this example, there is a CPU (core) with a cache and memory (see, e.g., FIG. 5). The CPU may be running any program. The cache is volatile memory; the main memory is (semi-)NVM. Work advances fastest and most efficiently when it can write to the cache without writing to the main memory. When energy runs low, modified lines in the cache are written back to the main memory. Once all cache lines are written to memory, this checkpoints the progress so far. Power can be removed and reapplied and execution may resume. The checkpoint energy needed goes up according to the number of dirty cache lines.

Also, in this example, the application code is not shown. This is because the example expects the application to be written normally, without consideration of energy management. This demonstrates that the example is applicable for management of any code, without modification of the code so that it will work in an opportunistic power management deployment. An obstacle with prior approaches is that code had to be rewritten to manage transactions explicitly or recompiled or otherwise rebuilt to run well in an opportunistic energy scenario. Instead of that approach, a power manager control loop is shown in pseudo-code in Table 3.

The example, therefore, contemplates an unmodified piece of software to run in an energy-managed scenario, and when energy is plentiful there is no overhead for checkpointing. More specifically, a typical system implementation may include the ability to evict modified cache lines to NVM or semi-volatile memory. When energy is plentiful, the system may not maintain a checkpoint in the semi-NVM or NVM. When energy is limited, each eviction of a modified line triggers writeback of other modified lines to ensure that the memory image is properly checkpointed.

In general, if there is low energy but still enough to do work, the application is allowed to "run ahead" some work steps. This procedure is essentially speculating that more energy will arrive and then it is possible to checkpoint. However, if energy does not arrive, the work done since the last checkpoint is lost. Thus, after some "run ahead" progress, it is preferable to stop work and wait for energy to arrive so that the work done so far can be checkpointed.

In the example, creating a checkpoint includes writing back all cache lines. However, a more efficient operation is when the cache is used normally—that is, any given line in the cache may be written back to main memory, without writing back other lines. This leads to an important design case and consideration: it is important to retain a checkpoint any time that the device might run out of energy. However, when there is sufficient energy, there is no need to retain a checkpoint, because we are assured that even if no more energy arrives, there is enough energy reserve that we can create a checkpoint. Thus, when energy is plentiful, this example embodiment runs at full performance and efficiency, and when energy is low, this example embodiment switches to a more conservative approach that checkpoints more frequently. This leads to the following two effects: "Work" can include a load or store that misses in the cache and in order to fetch the line, into the cache, the cache needs to evict some other line. If the line being evicted is modified, then writing it without writing all other modified lines means the NVM is not a checkpoint. For example, suppose memory is initially a checkpoint. Work increments the memory at address=A and then increments the memory for address=B. Both of these are modified in the cache but not in the main memory. Next, work needs to evict B. Suppose we allow eviction to proceed, so that memory contains the not-incremented memory at A and the incremented memory at B. Next, suppose energy runs out and the cache contents are lost. Consequently, on restart, there is no way to ensure recovery: if we resume execution at a point after B was incremented, then the memory for A has not been incremented so it is corrupt. Alternatively, if we re-execute the work, then the value of A will be correct but B got incremented twice.

However, there are some scenarios where it is acceptable to have memory that is not a checkpoint. There are two cases to consider: First, if the available energy is enough to checkpoint all of the lines, then we can allow the one-line writeback. Memory is not a checkpoint, but if available energy starts to run low, we will checkpoint before energy runs so low that we cannot checkpoint. Second, if the available energy is less than is needed to checkpoint, we cannot allow the writeback, as we might run out of energy before gathering enough energy to form a checkpoint. In this case, it is vital to retain a checkpoint in the NVM. In turn, work is blocked until there is sufficient energy to write both A and B and thus form an updated checkpoint.

TABLE 3

```
//"ahead" tracks work done since the last checkpoint
ahead = 0
//"want_checkpoint" tracks the desire to checkpoint as described
previously.
want_checkpoint = false
loop:
    if energy.available >= eneray.work + energy.checkpoint:
        eviction = work( )
        want_checkpoint = eviction or want_checkpoint
        ahead = ahead + 1
        goto loop
    if energy.available >= energy.checkpoint and (ahead >= 1000 or
    want_checkpoint):
        checkpoint( )
        ahead = 0
        want_checkpoint = false
        goto loop
    if not want_checkpoint and energy.available >= energy.work
    and ahead < 1000:
        want_checkpoint = work( )
        ahead = ahead + 1
        goto loop
    sleep(5 µsec)
    goto loop
```

If there is energy to both do work and checkpoint any prior work, do the work. Since there is enough energy to checkpoint, it is okay to do cache writebacks that leave memory in a non-checkpoint state. "Work( )" returns true if there was an eviction that leaves memory in a non-checkpoint state. "Eviction or want_checkpoint" computes true once any such eviction has occurred.

If there is sufficient available energy to checkpoint, then do so under either of two scenarios: there has been substantial work since the last checkpoint, or a checkpoint is desired before work should proceed.

If a checkpoint is needed then we must not do work until there is sufficient available energy to perform a checkpoint. Otherwise, if there is enough enemy to do work, do some work, unless there has been a lot of work since the last checkpoint (in which case we want to wait for enough energy to checkpoint the work so far).

Otherwise, the process waits for more energy to arrive.

A typical system implementation would likely be more complex because the energy for "work" may vary significantly. For example, an instruction to do an addition is low energy, while an instruction to read a sensor may be high energy. Thus "energy.work" could be conservative (enough to do any requested work), specifically related to the work that is about to be done, or the energy available for work could be a parameter to "work( )," which either does the work or requests more energy.

A typical system implementation would likely be more complex also because sometimes it is undesirable to lose data. For example, if a user presses a button, it may be more important to checkpoint which button got pressed than it is to make progress on other work. In this scenario, "work( )" could return true any time the work has read or written an input-output (I/O) device, so that a checkpoint is created even if "ahead" is small.

The number "1000" in the example is chosen arbitrarily. It represents a prediction about the future availability of energy, and some consideration of higher and lower values will clarify the operation. The control loop allows some work to be done speculatively—even when there is not enough reserve energy to guarantee that the work can be saved. The hope is that more energy will show up, but the risk is any work that is done and then discarded results in wasted energy. A smaller value is more conservative in that it does less speculative work and thus has less risk of wasting energy. As an extreme case, a factor of zero does work that is capable of being checkpointed (i.e., no speculation on whether energy will be available for checkpointing). On the other hand, stopping to wait for energy to show up delays work. Thus, if some energy is available and the odds are good that more will show up, then the energy risk can be rewarded with work getting done sooner. A practical implementation might adjust the value based on prior behavior: if energy runs out frequently, then do less speculative work; if energy runs out rarely, then do more speculative work.

Many real systems are more complex because some volatile state is held in the cache and some is also held in volatile registers inside the core. We can extend the example to use a slightly higher value for "energy.checkpoint" and use a designated NVM region so when a checkpoint is created, the volatile registers are saved, and on restart after running out of energy (entry to the top of the control loop) the volatile registers are reloaded.

The example use case no. 2 allows construction of a system with improved flexibility and with improved energy efficiency and performance. One advantage is that an unmodified program binary (any code) may be run correctly even when energy is unreliable. Many prior systems relied on program recompilation or binary translation to insert checkpointing operations, so they are limited to the subset of cases where these techniques can be used. Historically, the ability to execute unmodified programs is a significant advantage.

Another advantage is that the energy controller is able to adapt to the available energy and skip checkpointing when energy is above some threshold, only reverting to slower execution when faced with limited energy. Persistent memory is used to hold checkpoints but is allowed to be inconsistent (i.e., not checkpointed) with a copy of the contents of volatile memory (cache) when there is enough energy to re-create a checkpoint should the need arise. This means that when energy is plentiful, no checkpoint is retained, and execution proceeds with no (zero) checkpointing overhead. This represents the highest speed and highest efficiency expected because it suppresses checkpoints, which are expensive in both time and energy. When energy is limited, the system can adapt automatically to slower and less-efficient execution that ensures checkpoint consistency. In contrast, many prior systems are conservative: they checkpoint frequently in all situations. For example, a recompilation-based system may insert periodic checkpoint operations that are placed to ensure correctness when energy is low but that cause too-frequent checkpoints when energy is high.

SUPPLEMENTAL LIST OF EXAMPLE EMBODIMENTS

Example 1

A data processing device configured to deploy opportunistic power management strategies to manage energy, obtained from an intermittent source of power, based on an expected amount of energy available to the data processing device and on expected energy expenditures defined by data processing and memory content control operations performed by the data processing device, the data processing device comprising: an energy harvester configured to obtain the energy from the intermittent source of power; an energy estimator configured to determine the expected amount of energy available to the data processing device; a processor configured to perform a data processing operation having a first expected energy expenditure; a memory storage device configured to maintain data written to the memory storage device in connection with a memory writing operation, the maintaining and memory writing operation having a second expected energy expenditure; and a controller configured to: compare the expected amount of energy available and the first and second expected energy expenditures; and select, based on the comparing, a power management strategy from among the opportunistic power management strategies including continuing a partly completed data processing operation, writing to the memory storage device a checkpoint representing data associated with the partly completed data processing operation for potentially resuming the partly completed data processing operation after additional energy is obtained, and transitioning to a reduced-power consumption state while awaiting the additional energy to be obtained.

Example 2

A data processing device in which the controller is further configured to estimate the first and second expected energy expenditures based on, respectively, previous data processing and memory content control operations performed by the data processing device.

Example 3

A data processing device further comprising an energy storage device, and in which the expected amount of energy available to the data processing device includes energy stored in the energy storage device.

Example 4

A data processing device further comprising: a data input device operatively associated with the processor; a communications module operatively associated with the processor for transmitting processed results; and in which the data processing operation is selected from the group consisting of reading data from the data input device, providing to the communications module a processed output, and performing computation on the data from the data input device.

Example 5

A data processing device in which the energy estimator is further configured to determine the expected amount of energy available to the data processing device by anticipating a lower bound of energy available from the energy harvester during a harvesting episode.

Example 6

A data processing device in which the energy estimator is further configured to determine the first expected energy expenditure by determining an upper bound of energy consumed by a previous data processing operation.

Example 7

A data processing device in which the memory storage device is an NVM or a semi-NVM.

Example 8

A data processing device in which the memory storage device is an STT-RAM.

Example 9

A data processing device in which the processor is further configured to execute a pre-compiled software application for controlling the data processing operation, and in which the controller is further configured to perform the opportunistic power management strategies independently of the controlling of the data processing operation such that the pre-compiled software application is free from compiled instructions for managing power.

Example 10

A data processing device further comprising a cache memory for storing cache data, and in which the opportunistic power management strategies further include determining whether to checkpoint the cache data based on the expected amount of energy available and an amount of energy to checkpoint the cache data.

Example 11

A method performed by a data processing device for deploying opportunistic power management strategies to manage energy, obtained from an intermittent source of power, based on an expected value of energy available to the data processing device and on energy costs associated with data processing work and memory content control operations performed by the data processing device, the method comprising: obtaining energy from the intermittent source of power; determining the expected value of energy available to the data processing device; determining a work energy cost associated with working on a sequence of data processing work including collection of input data, computation of processed data associated with the input data, and communication of the processed data to another device through a network connection; determining a checkpoint energy cost associated with writing the processed data to a memory storage device during a memory writing operation; comparing the expected value of energy available and the work and checkpoint energy costs; and selecting, based on the comparing, a power management strategy from among the opportunistic power management strategies including: continuing the sequence of data processing work, checkpointing in the memory storage device an incremental result of the processed data, and transitioning to a reduced-power consumption state while awaiting for additional energy to be obtained.

Example 12

A method further comprising, in response to the expected value of energy available being greater than the checkpoint energy cost and less than a sum of the work and checkpoint energy costs, checkpointing and continuing working until the energy available is depleted or replenished.

Example 13

A method further comprising, in response to the expected value of energy available being greater than work energy cost but less than the checkpoint energy cost, completing the working without checkpointing.

Example 14

A method further comprising, in response to the expected value of energy available surpassing a sum of the work and checkpoint energy costs, and having multiple steps in the sequence of data processing work available, performing the multiple steps before checkpointing so as to reduce energy expended on checkpointing.

Example 15

A method further comprising checkpointing the incremental result in response to the incremental result comprising fundamental work so as to avoid data loss.

Example 16

A method further comprising maintaining a reserve of energy for checkpointing fundamental work and suppressing checkpointing until the expected value of energy available approaches an amount of energy maintained as the reserve of energy.

Example 17

A method in which the data processing device comprises a first memory having a first amount of volatility and a first energy cost to write, and a second memory having a second amount of volatility and a second energy cost to write, in which the first memory has a lower energy cost and a greater amount of volatility than those of the second memory, the method further comprising: in response to work being designated as non-recoverable, checkpointing the work to the second memory; and in response to work being designated as recoverable, checkpointing the work to the first memory.

Example 18

A method in which the data processing device comprises a first memory having a first amount of volatility and a first energy cost to write, and a second memory having a second amount of volatility and a second energy cost to write, in which the second memory has a lower energy cost and a greater amount of volatility than those of the first memory, the method further comprising: performing a first portion of the work; checkpointing the first portion in the first memory; performing a second portion of the work that is subsequent to the first portion; and checkpointing the second portion in the second memory.

Example 19

A method further comprising identifying whether data is critical; and in response to identifying data as being critical, checkpointing in the memory storage device the critical data so as to avoid data loss.

Example 20

A method further comprising selecting the power management strategy based on a threshold amount of stored data.

Example 21

Machine-readable storage includes machine-readable instructions, that when executed, implement a method as described herein.

Example 22

A system to deploy opportunistic power management strategies to manage energy, obtained from an intermittent source of power, based on an expected value of energy available to the system and on energy costs associated with data processing work and memory content control operations performed by the system, the system comprising: means for obtaining energy from the intermittent source of power; means for determining the expected value of energy available to the system; means for determining a work energy cost associated with working on a sequence of data processing work including collection of input data, computation of processed data associated with the input data, and communication of the processed data to another device through a network connection; means for determining a checkpoint energy cost associated with writing the processed data to a memory storage device during a memory writing operation; means for comparing the expected value of energy available and the work and checkpoint energy costs; and means for selecting, based on the comparing, a power management strategy from among the opportunistic power management strategies including: continuing the sequence of data processing work, checkpointing in the memory storage device an incremental result of the processed data, and transitioning to a reduced-power consumption state while awaiting for additional energy to be obtained.

Example 23

A system further comprising means for maintaining a reserve of energy for checkpointing fundamental work and suppressing checkpointing until the expected value of energy available approaches an amount of energy maintained as the reserve of energy.

Example 24

A system further comprising: means for identifying whether data is critical; and in response to identifying data as being critical, means for checkpointing in the memory storage device the critical data so as to avoid data loss.

Example 25

A system further comprising means for selecting the power management strategy based on a threshold amount of stored data.

CONCLUDING REMARKS

Skilled persons will recognize that the order of the items shown in flow diagrams is not limiting. Elements of method, including those shown and described elsewhere in this disclosure, can be readily performed in other orders, concurrently, or as sub-combinations. For that matter, skilled persons will understand that many changes may be made to the details of the above-described embodiments without departing from the underlying principles of the invention. The scope of the present invention should, therefore, be determined only by the following claims.

The invention claimed is:

1. A data processing device configured to deploy opportunistic power management strategies to manage energy, obtained from an intermittent source of power, based on an expected amount of energy available to the data processing device and on expected energy expenditures defined by data processing and memory content control operations performed by the data processing device, the data processing device comprising:
   an energy harvester configured to obtain the energy from the intermittent source of power;
   an energy estimator configured to determine the expected amount of energy available to the data processing device, in which the expected amount of energy available to the data processing device includes energy from the energy harvester;
   a data input device for obtaining sensed data;
   a communications module for transmitting processed results;
   a processor operatively associated with the data input device and the communications module, the processor configured to perform a data processing operation defining a first expected energy expenditure associated with one or more of obtaining the sensed data from the data input device, providing to the communications module a processed output, and performing computation on the sensed data obtained from the data input device;
   a memory storage device, including at least one of a non-volatile memory and a semi-non-volatile memory, configured to maintain data written to the memory storage device in connection with a memory writing operation, the maintaining and memory writing operation defining a second expected energy expenditure; and
   a controller configured to:
   compare the expected amount of energy available and the first and second expected energy expenditures, and
   select, based on the comparing, a power management strategy from among the opportunistic power management strategies including continuing, in response to the expected amount of energy exceeding the first expected energy expenditure, a partly completed data processing operation, writing, in response to the expected amount of energy exceeding the second expected energy expenditure, to the memory storage device a checkpoint representing data associated with the partly completed data processing operation for potentially resuming the partly completed data processing operation after additional energy is obtained, and transitioning to a reduced-power consumption state while awaiting the additional energy to be obtained.

2. The data processing device of claim 1, in which the controller is further configured to estimate the first and second expected energy expenditures based on, respectively, previous data processing and memory content control operations performed by the data processing device.

3. The data processing device of claim 1, further comprising an energy storage device, and in which the expected amount of energy available to the data processing device includes energy stored in the energy storage device.

4. The data processing device of claim 1, in which the energy estimator is further configured to determine the expected amount of energy available to the data processing device by anticipating a lower bound of energy available from the energy harvester during a harvesting episode.

5. The data processing device of claim 1, in which the energy estimator is further configured to determine the first expected energy expenditure by determining an upper bound of energy consumed by a previous data processing operation.

6. The data processing device of claim 1, in which the memory storage device is a non-volatile memory.

7. The data processing device of claim 1, in which the memory storage device is a spin-transfer torque random access memory (STT-RAM).

8. The data processing device of claim 1, in which the processor is further configured to execute a pre-compiled software application for controlling the data processing operation, and in which the controller is further configured to perform the opportunistic power management strategies independently of the controlling of the data processing operation such that the pre-compiled software application is free from compiled instructions for managing power.

9. The data processing device of claim 1, further comprising a cache memory for storing cache data, and in which the opportunistic power management strategies further include determining whether to checkpoint the cache data based on the expected amount of energy available and an amount of energy to checkpoint the cache data.

10. A method performed by a data processing device for deploying opportunistic power management strategies to manage energy, obtained from an intermittent source of power, based on an expected value of energy available to the data processing device and on energy costs associated with data processing work and memory content control operations performed by the data processing device, the method comprising:
   obtaining energy from the intermittent source of power;
   determining the expected value of energy available to the data processing device, in which the expected value of energy available to the data processing device includes the energy from the intermittent source of power;
   determining a work energy cost associated with working on a sequence of data processing work including collection of input data, computation of processed data associated with the input data, and communication of the processed data to another device through a network connection;
   determining a checkpoint energy cost associated with writing the processed data to a memory storage device, including at least one of a non-volatile memory and a semi-non-volatile memory, during a memory writing operation;
   comparing the expected value of energy available and the work and checkpoint energy costs; and
   selecting, based on the comparing, a power management strategy from among the opportunistic power management strategies including:
   continuing, in response to the expected value of energy available exceeding the work energy cost, the sequence of data processing work,
   checkpointing, in response to the expected value of energy available exceeding the checkpoint energy cost, in the memory storage device an incremental result of the processed data, and
   transitioning to a reduced-power consumption state while awaiting for additional energy to be obtained.

11. The method of claim 10, further comprising, in response to the expected value of energy available being greater than the checkpoint energy cost and less than a sum of the work and checkpoint energy costs, checkpointing and continuing working until the energy available is depleted or replenished.

12. The method of claim 10, further comprising, in response to the expected value of energy available being greater than work energy cost but less than the checkpoint energy cost, completing the working without checkpointing.

13. The method of claim 10, further comprising, in response to the expected value of energy available surpassing a sum of the work and checkpoint energy costs, and having multiple steps in the sequence of data processing work available, performing the multiple steps before checkpointing so as to reduce energy expended on checkpointing.

14. The method of claim 10, further comprising checkpointing the incremental result in response to the incremental result comprising fundamental work so as to avoid data loss.

15. The method of claim 10, further comprising maintaining a reserve of energy for checkpointing fundamental work and suppressing checkpointing until the expected value of energy available approaches an amount of energy maintained as the reserve of energy.

16. The method of claim 10, in which the data processing device comprises a first memory having a first amount of volatility and a first energy cost to write, and a second memory having a second amount of volatility and a second energy cost to write, in which the first memory has a lower energy cost and a greater amount of volatility than those of the second memory, the method further comprising:
   in response to work being designated as non-recoverable, checkpointing the work to the second memory; and
   in response to work being designated as recoverable, checkpointing the work to the first memory.

17. The method of claim 10, in which the data processing device comprises a first memory having a first amount of volatility and a first energy cost to write, and a second memory having a second amount of volatility and a second energy cost to write, in which the second memory has a lower energy cost and a greater amount of volatility than those of the first memory, the method further comprising:
   performing a first portion of the work;
   checkpointing the first portion in the first memory;
   performing a second portion of the work that is subsequent to the first portion; and
   checkpointing the second portion in the second memory.

18. The method of claim 10, further comprising:
   identifying whether data is critical; and
   in response to identifying data as being critical, checkpointing in the memory storage device the critical data so as to avoid data loss.

19. The method of claim 10, further comprising selecting the power management strategy based on a threshold amount of stored data.

* * * * *